(12) United States Patent
Chasen et al.

(10) Patent No.: US 6,543,338 B2
(45) Date of Patent: Apr. 8, 2003

(54) TOASTER OVEN WITH MODULAR STORAGE COMPARTMENT

(75) Inventors: James E. Chasen, West Haven; James A. Sandor, Trumbull; M. Anthony Melito, East Haven, all of CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/740,207

(22) Filed: Dec. 18, 2000

(65) Prior Publication Data

US 2002/0073854 A1 Jun. 20, 2002

(51) Int. Cl.[7] .................................................. A47J 37/08
(52) U.S. Cl. .............................. 99/357; 99/385; 99/393
(58) Field of Search .......................... 99/385, 339, 340, 99/393, 396, 399, 400, 401, 389, 390, 391, 357; 126/19 R, 273 R, 19 M, 275 R

(56) References Cited

U.S. PATENT DOCUMENTS

| 2,632,434 A | 3/1953 | Pearce |
| 2,634,749 A | * 4/1953 | Cone ....................... 126/273 R |
| 2,862,441 A | * 12/1958 | Schmall ....................... 99/339 |
| 2,920,551 A | * 1/1960 | Schmall ....................... 99/339 |
| 3,819,247 A | 6/1974 | Evans |
| 4,436,356 A | 3/1984 | Stelling |
| 4,479,684 A | 10/1984 | Doyel |
| 4,580,853 A | 4/1986 | Hitzeroth et al. |
| 4,666,113 A | 5/1987 | Itoh et al. |
| 4,753,406 A | 6/1988 | Kodama et al. |
| 4,792,195 A | 12/1988 | Adriaansen et al. |
| 5,127,721 A | 7/1992 | Inden |
| 5,197,378 A | 3/1993 | Scalise |
| 5,484,125 A | 1/1996 | Anoszko |

* cited by examiner

Primary Examiner—Reginald L. Alexander
(74) Attorney, Agent, or Firm—Barry E. Deutsch

(57) ABSTRACT

A toaster oven includes a modular storage compartment. The sidewalls of the storage compartment are vertically aligned with the sidewalls of the toaster oven. The respective sidewalls of the toaster oven and the storage compartment are connected to each other for securing the modular storage compartment to the toaster oven. The front wall of the storage compartment is movable relative to the sidewalls to provide access to the interior of the compartment.

5 Claims, 4 Drawing Sheets

TOASTER OVEN WITH MODULAR STORAGE COMPARTMENT

BACKGROUND OF THE INVENTION

This invention relates to improvements in toaster ovens, and in particular to a modular storage compartment for attachment to a toaster oven.

Toaster ovens are popular small kitchen appliances. A toaster oven may be mounted beneath a kitchen cabinet, or alternatively, a toaster oven may be supported on top of a kitchen's countertop. A toaster oven usually has many accessories such as a broil rack, pizza crisper, baking pan, and the like. The accessories are usually stored in the oven's cavity or in a kitchen drawer. Storing the accessories in the oven's cavity requires the user to remove the accessories prior to the oven's use. Once the accessories are removed and the toaster oven placed in use, the accessories must remain on the countertop, causing clutter and preventing substantive use of the countertop. Although it is more desirable to store the accessories in a drawer, these accessories are rather large, and it is most unusual for the accessories to be stored in a drawer where space is usually at a premium.

Accordingly, it is an object of this invention to enable a user of a toaster oven to store toaster oven accessories without inconvenience. It is a further object of the invention to include a storage compartment on a toaster oven, which is primarily dedicated to storing toaster oven accessories.

SUMMARY OF THE INVENTION

The foregoing objects and other objects of the invention are attained in a modular storage compartment for selective attachment to a toaster oven including a pair of spaced opposed sidewalls. The storage compartment includes a bottom wall, a top wall, a rear wall, and a pair of spaced opposed sidewalls and a front wall forming therebetween the storage compartment. The pair of spaced opposed sidewalls of the storage compartment are vertically alignable with the spaced opposed sidewalls of the toaster oven. The sidewalls of the storage compartment are joined to the sidewalls of the toaster oven via connectors. The front wall of the storage compartment is movable relative to the side, back, top and bottom walls to provide access to the interior of the compartment.

The objects of the invention are further attained in a combined toaster oven and modular storage compartment wherein the toaster oven includes a front wall, a back wall, opposed spaced side walls, a top wall and a bottom wall forming an enclosed cooking cavity. A modular storage compartment includes a top wall, a bottom wall, a pair of horizontally spaced sidewalls and a rear wall forming the storage compartment. The top wall of the storage compartment is spaced vertically below the bottom wall of the toaster oven. The sidewalls of the storage compartment are vertically aligned with the sidewalls of the toaster oven and the respective vertically aligned side walls are connected to mount the storage compartment to the toaster oven.

DESCRIPTION OF THE PREFERRED EMBODIMENTS

Figure 1:
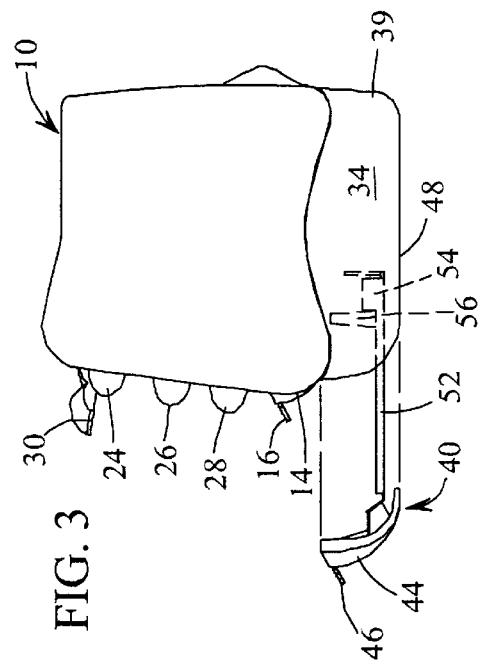
FIG. 1 is a top plan view of a toaster oven including the modular storage compartment of the present invention.

Referring now to the various figures of the drawing, preferred embodiments of the invention shall now be described in detail. In referring to the various figures, like numerals shall refer to like parts.

Figure 2:
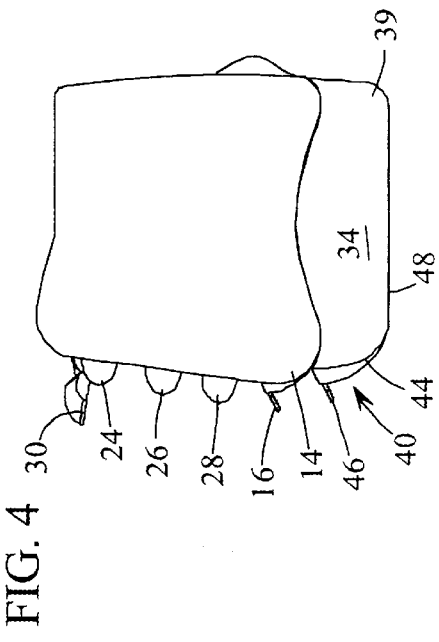
FIG. 2 is a front elevation view of the toaster oven of FIG. 1.

As illustrated in the various figures, a toaster oven 10 includes a top wall 12 and sidewalls 20, 22. Toaster oven 10 also includes a bottom section formed by removable crumb tray 14. Crumb tray 14 includes a handle 16 extending from its front face to enable the user to slide the crumb tray outwardly from the position shown in FIG. 2. Toaster oven 10 also includes a front panel formed by a transparent or translucent door 32. A handle 30 is mounted on the door to enable the user to open the door to gain access into the toasting compartment of toaster oven 10. Control knobs 24, 26 and 28 are mounted on the front face of toaster oven 10. The knobs are used to control the various operations which may be performed by toaster oven 10.

As indicated previously, a toaster oven usually has many accessories such as a broiler rack, pizza crisper, baking pan and the like. Heretofore, the accessories have been stored in the oven's cavity or in a kitchen drawer. Both of these storage means have one or more deficiencies.

To overcome the deficiencies of prior art toaster ovens, a unique storage compartment 40 has been provided. Storage compartment 40 is preferably mounted beneath the lower surface of crumb tray 14. Storage compartment 40 includes a front wall 44, side walls 34, 36, rear wall 39, a bottom wall 48, and a top wall 50. A handle 46 is mounted on front wall 44.

Figure 3:
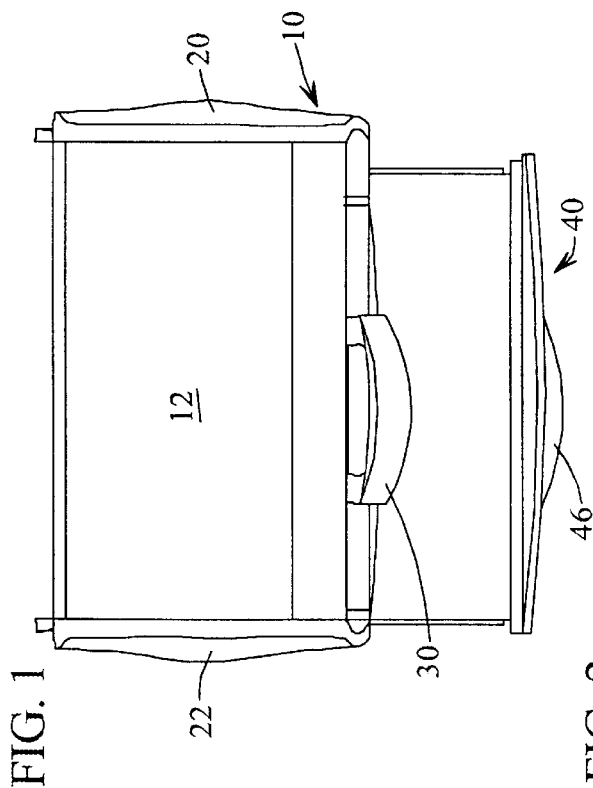
FIG. 3 is a side elevation view of the toaster oven of FIG. 1 with the modular storage compartment of the invention in an open position.
Figure 4:
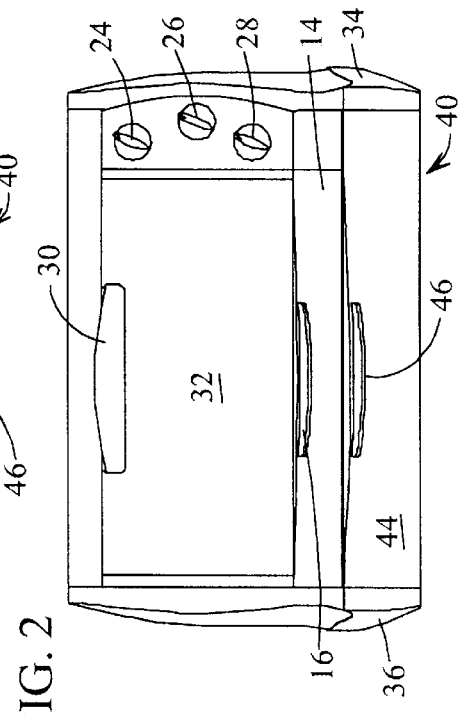
FIG. 4 is a view similar to that shown in FIG. 3 with the modular storage compartment in a closed position.

In a first embodiment as exemplified by the structure illustrated in FIGS. 3 and 4, front wall 44 is connected to a tray 52 that is moveably positioned in a horizontal plane above bottom wall 48 of storage compartment 40. Tray 52 includes a stop 54 formed by a vertically extending flange at its rear or distal end. Each side wall 34, 36 of storage compartment 40 includes a stop member 56 disposed at the forward end of the compartment and extending radially inward into the compartment. When moved to its open position as shown in FIG. 3, the forward movement of tray 52 is limited by stop 54 engaging stop member 56 mounted internally of the storage compartment. The abutment of vertical surfaces of stops 54, 56, limits the user from unintentionally removing tray 52 from the internal portion or storage space of storage compartment 40. When the tray is in the position shown in FIG. 3, various accessories can be placed on tray 52, and when the tray is filled, the tray will be moved rearwardly as shown in FIG. 4, to place the tray within the storage space of storage compartment 40. While the tray may be removed entirely from the storage compartment, it can only be so removed when the user deliberately angles the tray so that flange 54 is moved below stops 56. The use of stops 56 and vertical flange 54 prevents the unintentional removal of the tray from the storage compartment.

Connectors 62 such as screws or the like are used to join the storage compartment to the bottom surface of the toaster oven. Two pairs of connectors 62 are used on either side of the assembly so that the storage compartment is affixed to toaster oven 10.

Figure 10:
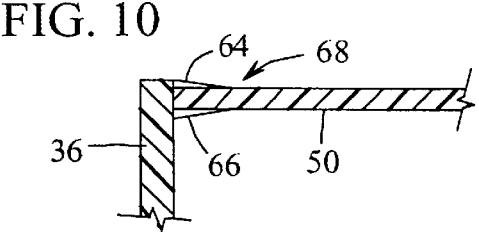
FIG. 10 is an enlarged fragmentary sectional view illustrating further details of the structure of the storage compartment.
Figure 9:
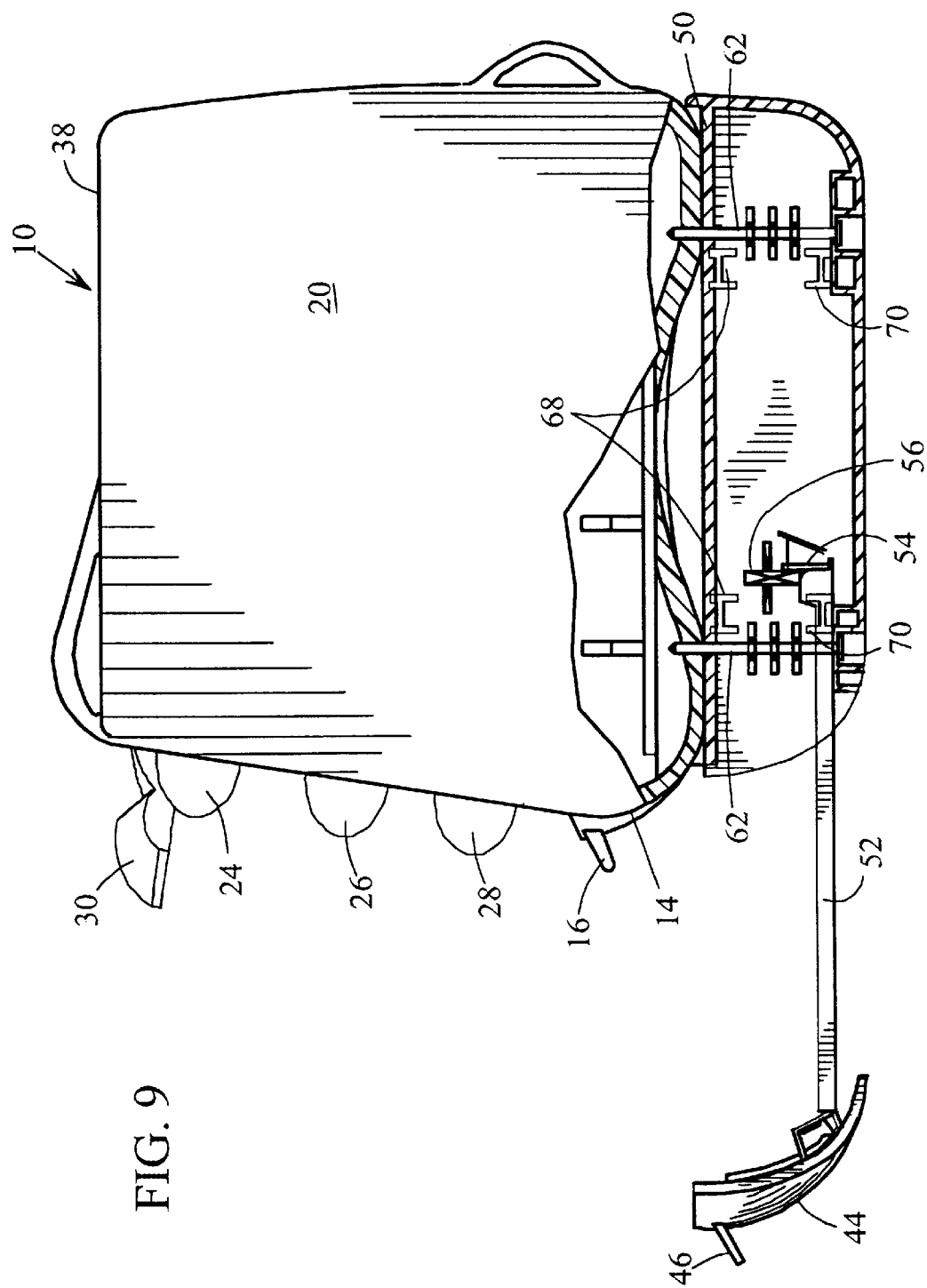
FIG. 9 is a view similar to that shown in FIG. 8 with the storage compartment in an open position.

To secure the sidewalls of the storage compartment to the bottom and top walls, respectively, 48, 50 of the compartment, each of the sidewalls includes a pair of upper laterally spaced clip members 66 and a pair of lower laterally spaced clip members 70. As shown in FIG. 10, each of the clip members includes a pair of vertically spaced fingers, 64, 66 which form therebetween a slot. The slots formed in a first pair of the upper clips 68 receive a first edge of the top wall 50 and a second pair of the upper clips 68 receive a second edge of the top wall. Likewise, the slots formed in a first pair of the lower clips receive a first edge of bottom wall 48 and the slots formed in a second pair of the lower clips receive a second edge of the bottom wall.

Figure 7:
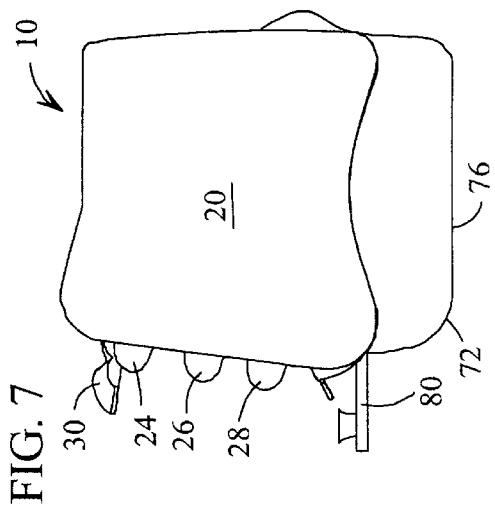
FIG. 7 is a side elevation view of the toaster oven illustrated in FIG. 5 with the modular storage compartment in an open position.
Figure 5:
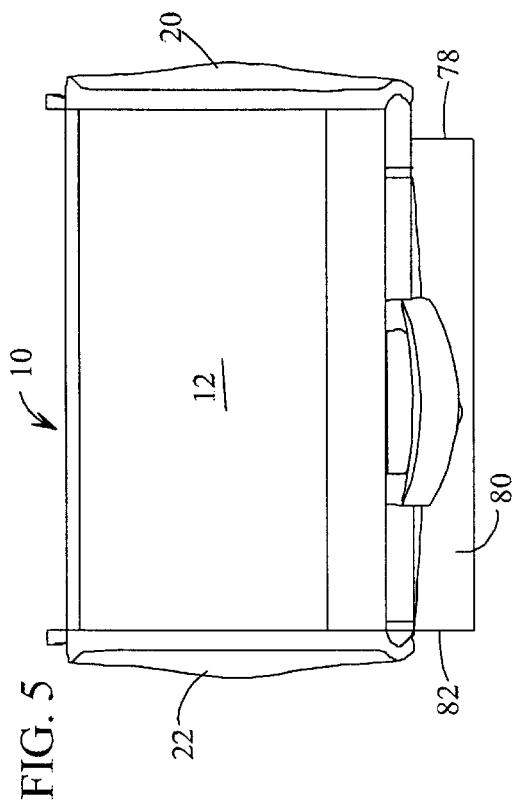
FIG. 5 is a top plan view of a toaster oven including a second embodiment of a modular storage compartment.
Figure 6:
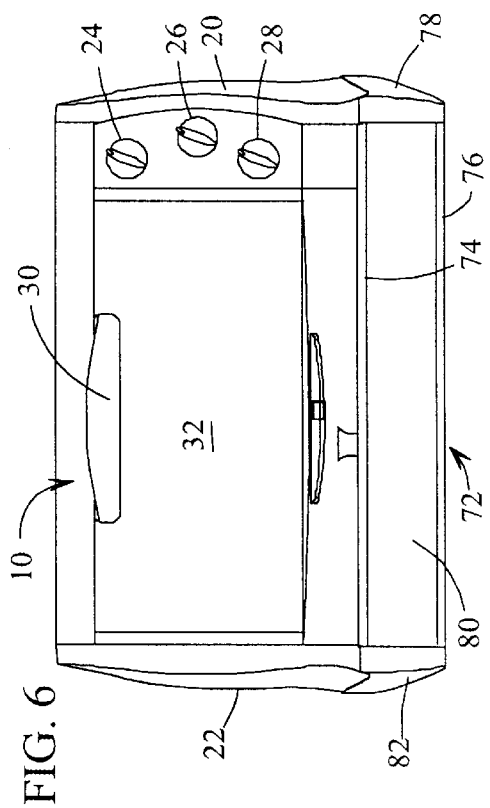
FIG. 6 is a front elevation view of the second embodiment of the invention.
Figure 8:
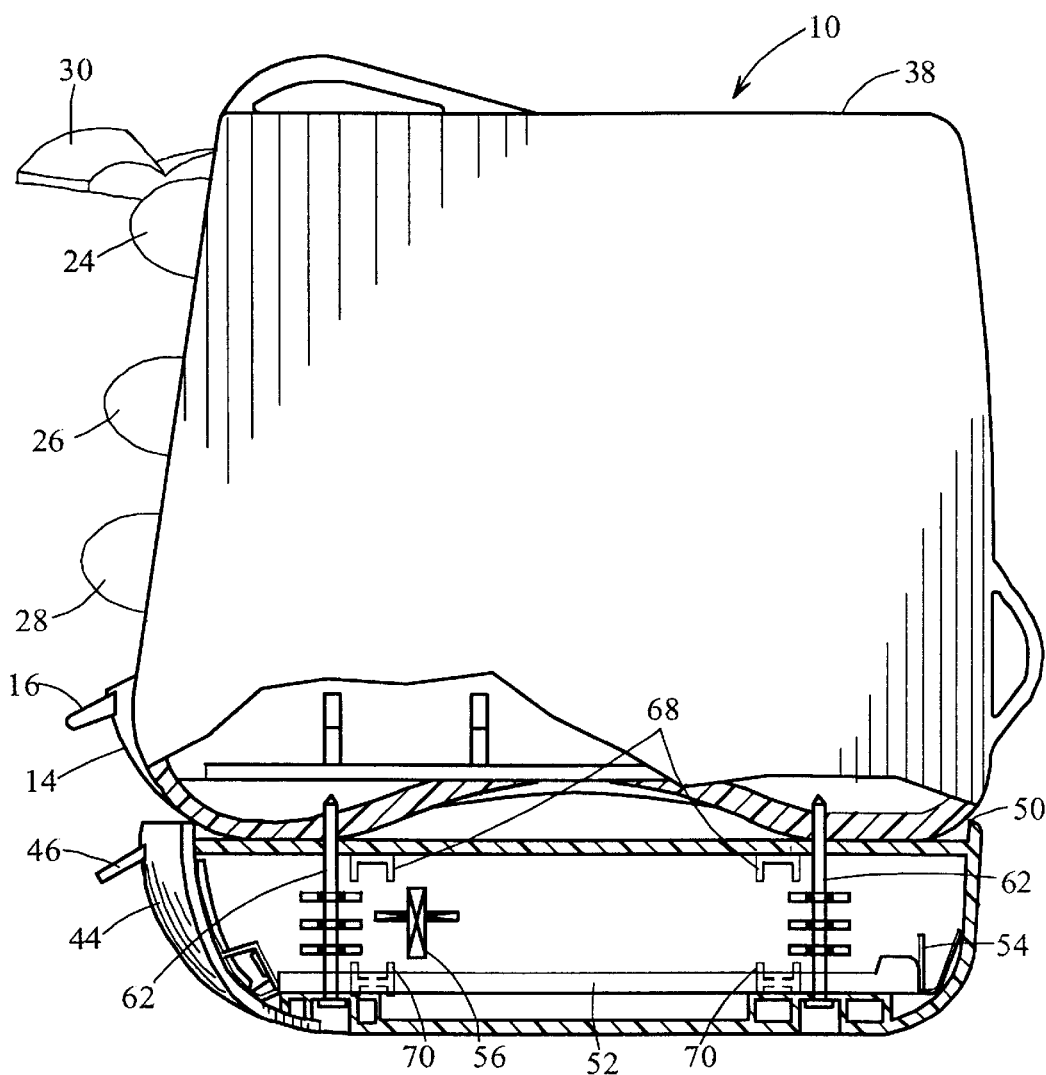
FIG. 8 is a partial sectional view of the toaster oven and storage compartment, illustrating details of the storage compartment.

An alternate embodiment of the invention is shown in FIGS. 5 through 7. In the alternate embodiment, storage compartment 72 includes top and bottom walls, respectively, 74, 76 and sidewalls 78 and 80. Storage compartment 72 also includes a front wall 80, which as illustrated, is pivotably connected to the top of sidewalls 78, 82 (compare FIGS. 6 and 7) so that the user may gain ready access to the interior of the storage compartment. The use of a pivotable door 80 eliminates the need to form a separable, moveable tray.

The present invention enables a user of a toaster oven to store accessories without inconvenience by providing a storage area, which is substantially integral with the toaster oven.

While preferred embodiments of the present invention have been described and illustrated, the present invention should not be limited thereto, but may be otherwise embodied within the scope of the following claims.

What is claimed as new and desired to be protected by Letters Patent of the United States is:

1. A modular storage compartment for selective attachment to a toaster oven including a pair of spaced opposed sidewalls, said storage compartment comprising:
   a bottom wall, a top wall, a rear wall, and a pair of spaced opposed sidewalls, and a front wall forming therebetween said storage compartment;
   said pair of spaced opposed sidewalls of said storage compartment being vertically aligned with the spaced opposed sidewalls of said toaster oven;
   a plurality of connectors for joining the sidewalls of said storage compartment to the sidewalls of said toaster oven;
   said front wall of said storage compartment being moveable relative to said side, back, top and bottom walls to provide access to the interior of the compartment; and
   each of said storage compartment sidewalls includes a pair of upper laterally spaced clip members and a pair of lower laterally spaced clip members, each of said clip members including a pair of vertically spaced fingers forming therebetween a slot, the respective slots in a first pair of upper clips receiving a first edge of said top wall, and a second pair of upper clips receiving a second edge of said top wall, the respective slots in a first pair of lower clips receiving a first edge of said bottom wall and a second pair of lower clips receiving a second edge of said bottom wall.

2. A modular storage compartment in accordance with claim 1, wherein the top wall of said storage compartment is mounted below a bottom wall of the toaster oven.

3. A storage compartment in accordance with claim 2, wherein said front wall is pivotally connected to said sidewalls of said storage compartment.

4. A modular storage compartment for selective attachment to a toaster oven including a pair of spaced opposed sidewalls, said storage compartment comprising:
   a bottom wall, a top wall, a rear wall, and a pair of spaced opposed sidewalls, and a front wall forming therebetween said storage compartment;
   said pair of spaced opposed sidewalls of said storage compartment being vertically aligned with the spaced opposed sidewalls of said toaster oven;
   a plurality of connectors for joining the sidewalls of said storage compartment to the sidewalls of said toaster oven;
   said front wall of said storage compartment being moveable relative to said side, back, top and bottom walls to provide access to the interior of the compartment;
   the top wall of said storage compartment is mounted below a bottom wall of the toaster oven;
   said front wall is formed on a tray that is moveably positioned in a horizontal plane in said storage compartment; and
   each of said storage compartment sidewalls includes a stop member extending inwardly into the compartment interior into the path of movement of said tray towards the front wall of said storage compartment.

5. A combined toaster oven and modular storage compartment comprising:
   said toaster oven including a front wall, a back wall, opposed sidewalls, a top wall, and a bottom wall forming an enclosed cooking cavity therebetween; said modular storage compartment comprising a top wall, a bottom wall, a pair of horizontally spaced sidewalls, and a rear wall forming said storage compartment therebetween, said top wall of said storage compartment being spaced vertically below the bottom wall of the toaster oven, said sidewalls of said storage compartment being vertically aligned with the sidewalls of said toaster oven and the respective vertically aligned sidewalls being connected to secure the storage compartment to the toaster oven;
   said storage compartment has a front wall that is moveable relative to the top, bottom, rear and side walls of said storage compartment;
   said front wall of said storage compartment is formed on a tray that is moveably positioned in said storage compartment for movement along a horizontal plane; and a stop member is positioned is positioned in the path of movement of said tray to restrict movement of said tray along a horizontal plane.

* * * * *